Nov. 24, 1925.  
R. R. CRANE  
GANG SAW HANGER  
Filed May 24, 1924  
1,563,256

Inventor  
R. R. Crane  
By C. A. Snow & Co  
Attorneys.

Patented Nov. 24, 1925.

1,563,256

UNITED STATES PATENT OFFICE.

ROBERT R. CRANE, OF MENOMINEE, MICHIGAN.

GANG-SAW HANGER.

Application filed May 24, 1924. Serial No. 715,659.

*To all whom it may concern:*

Be it known that I, ROBERT R. CRANE, a citizen of the United States, residing at Menominee, in the county of Menominee and State of Michigan, have invented a new and useful Gang-Saw Hanger, of which the following is a specification.

This invention relates to saws and more particularly saws of the gang type, the primary object of the invention being to provide novel means for connecting the saw supports to a saw blade, whereby portions of the saw may be cut away adjacent to the securing members when the teeth have been sharpened to a point wherein enlargements are formed at the ends of the saw.

Another important object of the invention is to provide a securing means which may be readily and easily operated when it becomes necessary to move the securing means to another position adjacent to the ends of the saw.

With the foregoing and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Referring to the drawing.

Figure 1:
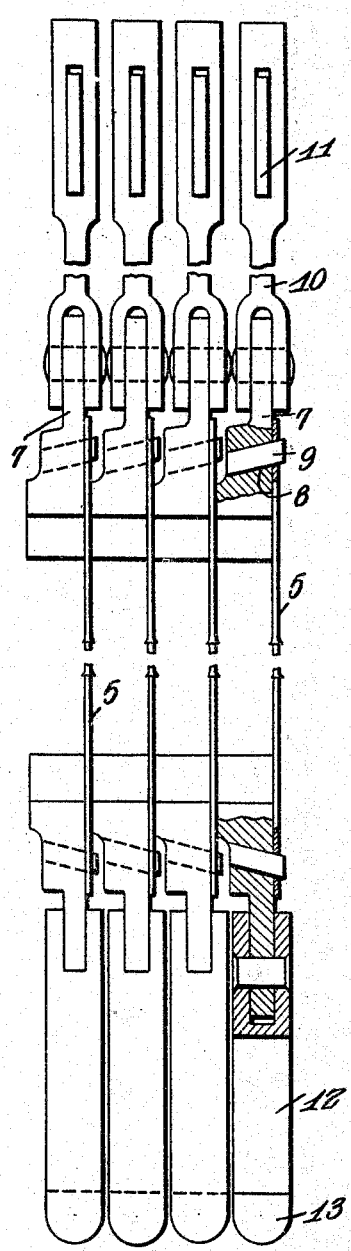
Figure 1 is an elevational view disclosing gang saws constructed in accordance with the present invention, shown partly in section.
Figure 2:
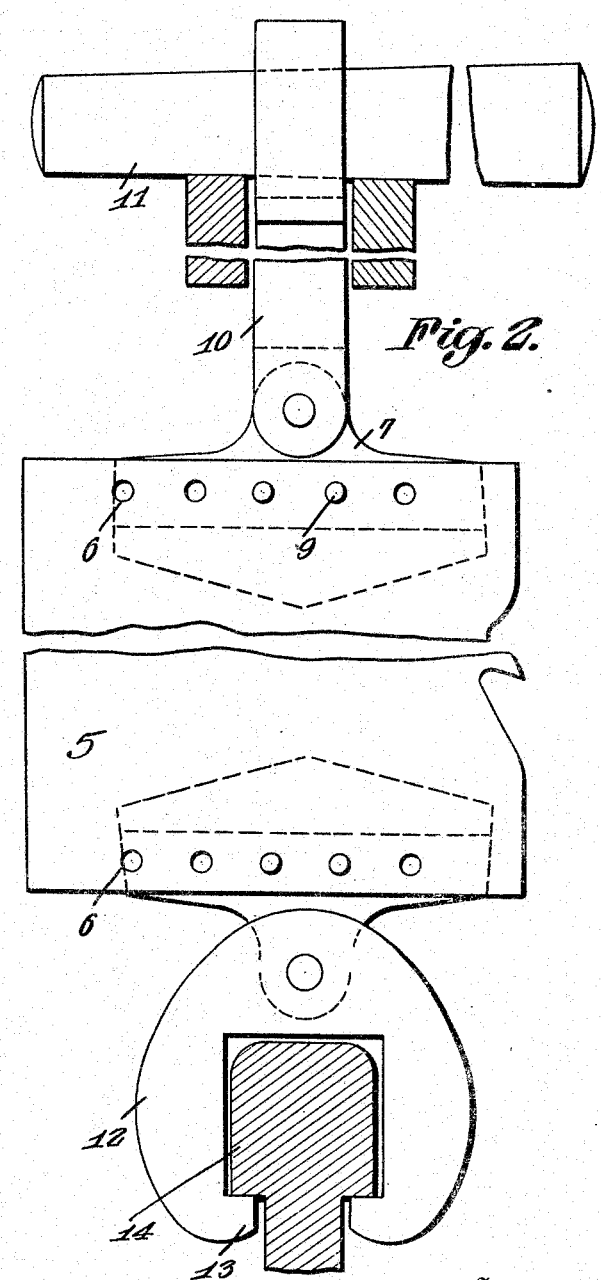
Figure 2 is a side elevational view of one of the saws shown partly in section.

Referring to the drawing in detail, the reference character 5 indicates the saw blades, each of which is provided with a plurality of openings 6 which are arranged in spaced relation with each other and disposed adjacent to the ends of the saw blade.

The means employed for securing the saw blades to a suitable operating mechanism includes a head 7 which is provided with a plurality of openings 8, which are designed to register with the openings 6 at the ends of the blade 5 to receive the securing pins 9 which, due to an inclination of the openings, are disposed at angles as clearly shown by Figure 1 of the drawing.

Pivotally connected with the head 7 at one end of the blade is the usual securing member 10 formed with a suitable opening to receive the tapered pin 11 for securing the saw to the operating mechanism associated therewith. At the opposite end of the saw blade is a pivoted member 12 which is formed with inwardly extended jaws 13 providing means to be engaged by the head 14 of the operating mechanism.

From the foregoing it will be obvious that when the toothed edge of a saw becomes worn to such an extent that the ends interfere with the operation of the saw, it is only necessary to disconnect the saw from the heads and cut off a portion of the saw blade interfering. The saws may be moved forward to such position with respect to the hanger head as to expose an appreciable amount of saws on account of wear, the saws being now in such position as to clear the article under operation while saws are in motion.

I claim:—

In a device of the character described, saw heads, said saw heads having a plurality of spaced openings, saw blades having openings adapted to register with the openings of the saw heads, the walls of the openings being inclined with respect to the front and rear surfaces of the heads, and securing pins adapted to be forced through openings of the saw blade and into the inclined openings of the saw heads to secure the saw blades to the saw heads.

In testimony that I claim the foregoing as my own, I have hereto affixed my signature.

ROBERT R. CRANE.